US010952185B2

United States Patent
Bergqvist et al.

(10) Patent No.: US 10,952,185 B2
(45) Date of Patent: Mar. 16, 2021

(54) METHODS AND ARRANGEMENTS FOR MANAGING ALLOCATION OF UPLINK RESOURCES REGARDING REMAINING DATA BLOCKS OF AN UPLINK TRANSMISSION

(71) Applicant: Telefonaktiebolaget LM Ericsson (Publ), Stockholm (SE)

(72) Inventors: Jens Bergqvist, Linköping (SE); Ulf Händel, Norsholm (SE); Björn Hofström, Linköping (SE); Nicklas Johansson, Brokind (SE); Hans Torstensson, Vreta Kloster (SE)

(73) Assignee: Telefonaktiebolaget LM Ericsson (Publ)

( * ) Notice: Subject to any disclaimer, the term of this patent is extended or adjusted under 35 U.S.C. 154(b) by 53 days.

(21) Appl. No.: 15/321,088

(22) PCT Filed: Nov. 10, 2016

(86) PCT No.: PCT/SE2016/051104
§ 371 (c)(1),
(2) Date: Dec. 21, 2016

(87) PCT Pub. No.: WO2017/082806
PCT Pub. Date: May 18, 2017

(65) Prior Publication Data
US 2017/0265180 A1    Sep. 14, 2017

Related U.S. Application Data

(60) Provisional application No. 62/253,289, filed on Nov. 10, 2015.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/1671* (2013.01); *H04L 5/0055* (2013.01);
(Continued)

(58) Field of Classification Search
CPC ..... H04L 1/1887; H04L 47/70; H04L 5/0096; H04L 5/0078
See application file for complete search history.

(56) References Cited

U.S. PATENT DOCUMENTS 9,271,268 B2 *  2/2016  Iwai ...................... H04L 5/0037
2009/0080397 A1 *  3/2009  Kim ..................... H04W 72/042
370/338

(Continued)

FOREIGN PATENT DOCUMENTS

CN    101926133 A    12/2010
CN    103503550 A    1/2014
(Continued)

OTHER PUBLICATIONS

3GPP TSG GERAN#67 GP-151039, (Revision of GP-150994), Title: "New Work Item on Extended Coverage GSM (EC-GSM) for Support of Cellular Internet of Things," Agenda Item: 11.1, Source: Ericsson LM, Intel, Gemalto N.V., MediaTek Inc., TeliaSonera AB, Sierra Wireless S.A., Telit Communications S.p.A., Orange, Nokia Networks, Alcatel-Lucent, Document for Approval, Conference Location and Date, Yinchuan, P.R. China, Aug. 10-14, 2015 consisting of 7-pages.

(Continued)

*Primary Examiner* — Jason E Mattis
*Assistant Examiner* — Bao G Nguyen
(74) *Attorney, Agent, or Firm* — Christopher & Weisberg, P.A.

(57) ABSTRACT

A network node comprised in a wireless communication network is for managing allocation of uplink resources (Continued)

regarding remaining data blocks of an uplink transmission performed by a device. The network node sends, to the device, first allocation information that identifies uplink resources that have been allocated to the device for uplink transmission of said remaining data blocks. The remaining data blocks being associated with the allocated uplink resources, respectively. The network node also sends, to the device, and the device receives, a second allocation information that identifies one or more of said allocated uplink resources identified by the first allocation information, wherein said second allocation information further identifies one or more of said remaining data blocks as data blocks to be excluded by the device.

24 Claims, 7 Drawing Sheets

(51) Int. Cl.
  *H04L 1/16* (2006.01)
  *H04W 4/70* (2018.01)
  *H04W 88/02* (2009.01)
  *H04W 88/08* (2009.01)
  *H04L 1/18* (2006.01)
(52) U.S. Cl.
  CPC ............ *H04W 4/70* (2018.02); *H04L 1/1858* (2013.01); *H04W 72/042* (2013.01); *H04W 88/02* (2013.01); *H04W 88/08* (2013.01)

(56) References Cited

U.S. PATENT DOCUMENTS

| | | | | |
|---|---|---|---|---|
| 2012/0155412 | A1* | 6/2012 | Kawamura | H04J 11/003 370/329 |
| 2012/0281652 | A1* | 11/2012 | Kim | H04W 72/042 370/329 |
| 2013/0072242 | A1* | 3/2013 | Iwai | H04L 5/0037 455/509 |
| 2014/0010175 | A1* | 1/2014 | Chiu | H04W 72/042 370/329 |
| 2018/0139011 | A1* | 5/2018 | Chae | H04B 7/26 |

FOREIGN PATENT DOCUMENTS

| | | |
|---|---|---|
| CN | 104380792 A | 2/2015 |
| CN | 104737614 A | 6/2015 |
| CN | 104883743 A | 9/2015 |
| WO | 2013112703 A2 | 8/2013 |
| WO | 2014056426 A1 | 4/2014 |
| WO | 2014148810 A2 | 9/2014 |

OTHER PUBLICATIONS

3GPP TR 45.820 V13.0.0 (Aug. 2015) 3rd Generation Partnership Project; Technical Specification Group GSM/EDGE Radio Access Network; Cellular System Support for Ultra-Low Complexity and Low Throughput Internet of Things (CIoT) (Release 13) Sep. 22, 2015 consisting of 495-pages.
International Search Report and Written Opinion dated Feb. 16, 2017 for International Application Serial No. PCT/SE2016/051104, International Filing Date—Nov. 10, 2016 consisting of 12-pages.
3GPP TSG GERAN Ad Hoc#1 FS_IoT_LC, Tdoc GPC150078, Title: "EC-GSM—PDTCH Resource Transmission Management," Agenda item 2.4.4, Source: Ericsson, Conference Location and Date: Sofia Antipolis, France, Feb. 2-5, 2015 consisting of 10-pages.
3GPP TSG GERAN FS_IoT_LC Adhoc#2, Tdoc GPC150220, Title: "Pseudo CR45.820-EC-GSM, PACCH Message Set," Agenda item 2.4.2.1, Source: Ericsson LM, Conference Location and Date: Sofia Antipolis, France, Apr. 20-23, 2015 consisting of 5-pages.
3GPP TSG-GERAN #70, GP-160315, Change Request: 44.060, CR-1624, Current Version 13.1.0, Title: "EC-GSM-IoT Procedures and Timers Miscellaneous Corrections," Source to WG: Ericsson LM, Source to TSG: G2, Conference Location and Date: Nanjing, PR China, May 23-27, 2016 consisting of 91-pages.
3GPP_TSG-RAN6 Meeting #1, R6-160061, Change Request: 44.060, CR-1630, Current Version 13.2.0, Title: "Miscellaneous Corrections to EC-GSM-IoT," Source to WG: Nokia Networks, Source to TSG: R6, Conference Location and Date: Gothenburg, Sweden, Aug. 22-26, 2016 consisting of 19-pages.
Indian Examination Report dated Jun. 8, 2020 for Application No: 201847016918; consisting of 6-pages.
Chinese Office Action, Search Report and English Translation dated Nov. 3, 2020 for Application No. 201680065762.7, consisting of 25-pages.

* cited by examiner

METHODS AND ARRANGEMENTS FOR MANAGING ALLOCATION OF UPLINK RESOURCES REGARDING REMAINING DATA BLOCKS OF AN UPLINK TRANSMISSION

CROSS-REFERENCE TO RELATED APPLICATIONS

This Application is a Submission Under 35 U.S.C. § 371 for U.S. National Stage Patent Application of International Application No. PCT/SE2016/051104, filed Nov. 10, 2016 entitled "METHODS AND ARRANGEMENTS FOR MANAGING ALLOCATION OF UPLINK RESOURCES REGARDING REMAINING DATA BLOCKS OF AN UPLINK TRANSMISSION," which claims priority to U.S. Provisional Application No. 62/253,289, filed Nov. 10, 2015, entitled "METHODS AND ARRANGEMENTS FOR MANAGING ALLOCATION OF UPLINK RESOURCES REGARDING REMAINING DATA BLOCKS OF AN UPLINK TRANSMISSION," the entirety of both which are incorporated herein by reference.

TECHNICAL FIELD

Embodiments herein relate to methods and nodes in a wireless communication network, e.g. telecommunication network, for managing allocation of uplink resources regarding remaining data blocks of an uplink transmission.

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network that typically is a cellular communications network, which may also be referred to as a wireless communication system, or radio communication system, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. a device that is not necessarily associated with a conventional user, such as a human, directly using the device.

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G and 3G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by the 3rd Generation Partnership Project (3GPP), that extends and improves the performance of existing 3rd generation mobile telecommunication networks utilizing the WCDMA. Such networks may be named WCDMA/HSPA.

In 3GPP Long Term Evolution (LTE), which may be referred to as 4th generation or 4G, base stations, which may be referred to as eNodeBs or eNBs, may be directly connected to other base stations and may be directly connected to one or more core networks.

The 3GPP has undertaken to evolve further the UTRAN and GSM based radio access network technologies, for example into evolved UTRAN (E-UTRAN) used in LTE.

The expression downlink, which may be abbreviated DL, is used for the transmission path from the base station to the wireless device. The expression uplink, which may be abbreviated UL, is used for the transmission path in the opposite direction i.e. from the wireless device to the base station.

Machine Type of Communication (MTC) has in recent years, especially in the context of the Internet of Things (IoT), shown to be a growing market segment for cellular technologies, especially for GSM/EDGE with its more or less global coverage, ubiquitous connectivity and price competitive devices. Realization of IoT benefit from utilizing cellular technologies and GSM technology is of great, perhaps of greatest, interest to utilize at least initially. In general it is desirable to be able to (re)use existing wireless communication systems and cellular technologies for new type of devices such as MTC devices. An MTC device is typically a wireless device that is a self and/or automatically controlled unattended machine and that is typically not associated with an active human user in order to generate data traffic. A MTC device is typically much more simple, and associated with a more specific application or purpose, than and in contrast to a conventional mobile phone or smart phone. MTC involve communication to and/or from MTC devices, which communication typically is of quite different nature and with other requirements than communication associated with e.g. conventional mobile phones and smart phones. In the context of and growth of the IoT it is evidently so that MTC traffic will be increasing and thus needs to be increasingly supported in wireless communication systems.

A problem related to (re)using existing technologies and systems is e.g. that the requirements for the new type of devices typically is different than conventional requirements, e.g. regarding the type and amount of traffic, performance etc. Existing systems have not been developed with these new requirements in mind. Also, traffic generated by new type of devices will typically be in addition to conventional traffic already supported by an existing system, which existing traffic typically needs to continue to be supported by and in the system, preferably without any substantial disturbance and/or deterioration of already supported services and performance.

Any modifications need of existing systems and technology should of course be cost efficient, such as enabled by low complexity modifications, and preferably allowing legacy devices already being employed to continue to be used and co-exist with the new type of devices in one and the same wireless communication network.

Extended Coverage GSM (EC-GSM) is e.g. discussed in GP-151039, "New Work Item on Extended Coverage GSM (EC-GSM) for support of Cellular Internet of Things (CIoT_EC_GSM)", Ericsson L M, Intel, Gemalto N.V., MediaTek Inc., TeliaSonera AB, Sierra Wireless, S.A., Telit Communications S.p.A., ORANGE, Nokia Networks, Alcatel Lucent. Cellular Internet of Things (IoT), is e.g. discussed in 3GPP TR 45.820 V13.0.0, "Cellular System Support for Ultra Low Complexity and Low Throughput Internet of Things".

EC-GSM e.g. has the intention to improve coverage with 20 dB, to improve battery life time, keeping a minimum bitrate and to decrease device complexity. On the control channels the coverage is improved by for example using blind repetitions of radio blocks while on the data channels the coverage is improved using a combination of blind repetitions and Hybrid Automatic Repeat Request (HARQ) retransmissions of radio blocks.

In order to both increase the coverage of the uplink data transmissions and to decrease the device complexity a so called fixed uplink allocation is used. The resources to use when transmitting in the uplink are then allocated in control messages, either on a common control channel for the first uplink allocations and then within ack/nack messages on Downlink Extended Coverage Packet Associated Control Channel (DL EC-PACCH). An uplink allocation is then included per Radio Link Control (RLC) Data block that the device shall transmit. The size of each such uplink allocation depends on the coverage extension that is required for the device, i.e. the number of blind repetitions that are needed. In order for the network to be able to perform so called chase combining of the received RLC Data blocks, including e.g. the RLC/Medium Access Control, RLC/MAC header, when retransmitted, the network must know in advance what RLC Data block that is received in each uplink allocation. Both the data part and the header of the RLC Data blocks must then be the same in retransmissions as in the previous transmission.

SUMMARY

It is an object to alleviate or at least reduce one or more problems indicated herein. Hence, the object may be to provide one or more improvements with regard to how uplink resources are allocated regarding remaining data blocks of an uplink transmission and that should be suitable for a wireless communication network supporting EC-GSM.

According to a first aspect of embodiments herein, the object is achieved by a method, performed by a network node comprised in a wireless communication network, for managing allocation of uplink resources regarding remaining data blocks of an uplink transmission performed by a device. The network node sends, to the device, first allocation information that identifies uplink resources that have been allocated to the device for uplink transmission of said remaining data blocks. The remaining data blocks being associated with the allocated uplink resources, respectively. The network node further sends, to the device, a second allocation information that identifies one or more of said allocated uplink resources identified by the first allocation information and that have been allocated for uplink transmission of said remaining data blocks. Said second allocation information further identifies one or more of said remaining data blocks as data blocks to be excluded by the device.

According to a second aspect of embodiments herein, the object is achieved by a computer program comprising instructions that when executed by a network node causes the network node to perform the first method according to the first aspect.

According to a third aspect of embodiments herein, the object is achieved by a computer readable medium comprising the computer program according to the second aspect.

According to a fourth aspect of embodiments herein, the object is achieved by a second method, performed by a device, for managing allocation of uplink resources regarding remaining data blocks of an uplink transmission performed by the device in a wireless communication network. The device receives, from a network node comprised in the wireless communication network, a second allocation information that identifies uplink resources that have been allocated to the device for uplink transmission of said remaining data blocks. The remaining data blocks being associated with the allocated uplink resources, respectively. The second allocation information further identifies one or more of the remaining data blocks as data blocks to be excluded by the device.

According to a fifth aspect of embodiments herein, the object is achieved by a computer program comprising instructions that when executed by a device causes the device to perform the second method according to the fourth aspect.

According to a sixth aspect of embodiments herein, the object is achieved by a computer readable medium comprising the computer program according to the fifth aspect.

According to a seventh aspect of embodiments herein, the object is achieved by a network node, configured to be comprised in a wireless communication network, for managing allocation of uplink resources regarding remaining data blocks of an uplink transmission performed by a device. The network node is configured to send, to the device, first allocation information that identifies uplink resources that have been allocated to the device for uplink transmission of said remaining data blocks. The remaining data blocks being associated with the allocated uplink resources, respectively. The network node is further configured to send, to the device, a second allocation information that identifies one or more of said allocated uplink resources identified by the first allocation information and that have been allocated for uplink transmission of said remaining data blocks. Said second allocation information further identifies one or more of said remaining data blocks as data blocks to be excluded by the device.

According to an eighth aspect of embodiments herein, the object is achieved by device for managing allocation of uplink resources regarding remaining data blocks of an uplink transmission performed by the device in a wireless communication network. The device is configured to receive, from a network node comprised in the wireless communication network, a second allocation information that identifies uplink resources that have been allocated to the device for uplink transmission of said remaining data blocks. The remaining data blocks being associated with the allocated uplink resources, respectively. The second allocation information further identifies one or more of the remaining data blocks as data blocks to be excluded by the device.

Embodiments herein, such as described above, with the second allocation information that identifies one or more remaining data blocks to be excluded, facilitate preservation of the associations between remaining data blocks and allocated uplink resources, i.e. of the associations associated with, e.g. that followed from, the first allocation information and/or that were valid for the allocated uplink resources identified by the first allocation information. The associations are e.g. enabled to be preserved in cases where they else, such as conventionally, would be lost.

For example, the device conventionally typically operate so that the oldest data blocks, e.g. those with lowest sequence number, always are transmitted first. This is normally a desirable way of operation and may be desirable in response to the first allocation information, but can cause problem in response to the second allocation information e.g. when the first allocation information was not received. In response to the second allocation information, without excluding data blocks as in embodiment herein, a remaining data block would risk to suddenly be associated with an allocated resource that, for the first allocation information, was associated with another remaining data block, e.g. with the second lowest sequence number. Hence, the same data block would be associated with two different uplink resources and the previous association would have been changed. This would cause problems for the wireless communication network, including e.g. the network node, and combining of data, as can be realized and according to was discussed above in the Background, and may in particular cause problems in the case of EC-GSM, but can thus be avoided thanks to embodiments herein.

Hence, embodiments herein provide an improvement with regard to how uplink resources are allocated regarding remaining data blocks of an uplink transmission and that is suitable for a wireless communication network supporting EC-GSM.

BRIEF DESCRIPTION OF THE DRAWINGS

The various aspects of embodiments disclosed herein, including particular features and advantages thereof, will be readily understood from the following detailed description and the accompanying drawings, in which FIGS. 1-9 are shown.

FIG. 1 is a block diagram schematically depicting an example of a wireless communication network in which embodiments herein may be implemented.

FIG. 2 is a combined signaling diagram and flowchart for describing some embodiments herein.

FIG. 3 schematically illustrates a first example of transmission of an additional, second Packet Uplink Ack/Nack (PUAN) message on DL PACCH.

FIG. 4 schematically illustrates a second example of transmission of an additional, second Packet Uplink Ack/Nack (PUAN) message on DL PACCH.

FIG. 5 is a flowchart schematically illustrating embodiments of a first method according to embodiments herein.

FIG. 6 is a functional block diagram for illustrating embodiments of a network node according to embodiments herein and how it can be configured to carry out the first method.

FIG. 7 is a flowchart schematically illustrating embodiments of a second method according to embodiments herein.

FIG. 8 is a functional block diagram for illustrating embodiments of a device according to embodiments herein and how it can be configured to carry out the second method.

DETAILED DESCRIPTION

Figure 1:
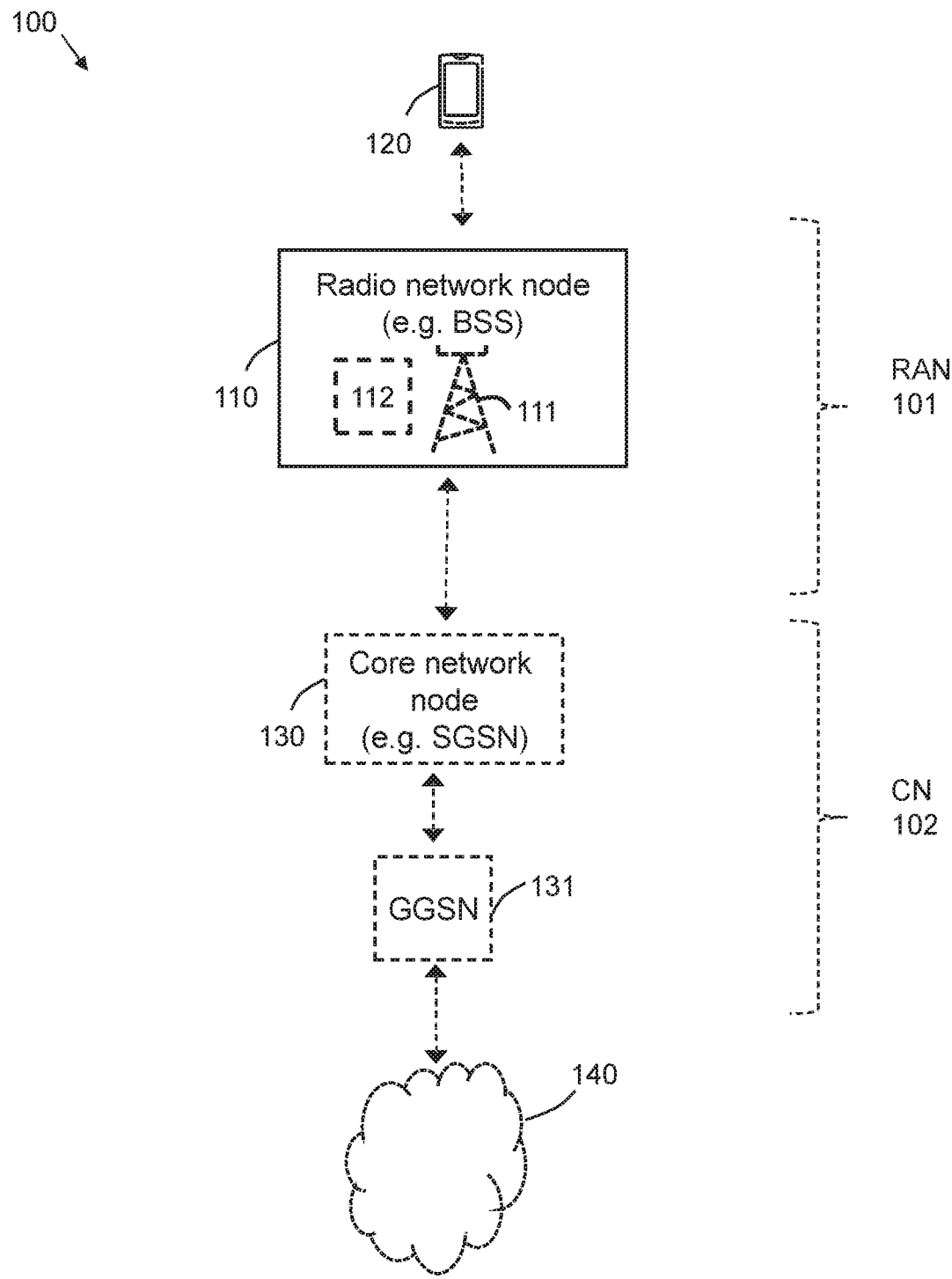

Throughout the following description similar reference numerals have been used to denote similar elements, units, modules, circuits, nodes, parts, items or features, when applicable. In the figures, features that appear only in some embodiments are typically indicated by dashed lines.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As a development towards embodiments herein, problems generally indicated in the Background will first be further elaborated upon.

It has been proposed for EC-GSM that a device shall listen to the downlink EC-PACCH channel for an ack/nack message that informs the device about what RLC Data blocks that have been received by the network and provide new uplink allocations for transmission of the not yet received blocks. The not yet received blocks that the device shall transmit in the allocated blocks are the blocks that the device has already transmitted but that were not received by the network, i.e. blocks that are nacked in the same message, and possibly blocks that have not yet been transmitted by the device. The latter can be the case if the network did not allocate uplink resources for all the RLC Data blocks that the device needs to transmit in the previous message(s).

The RLC Data blocks to be sent by the device in the different allocated uplink blocks are given by the ack/nack information, starting with the oldest block, e.g. with the lowest sequence number, followed by the second oldest block, e.g. with second lowest sequence number, and so on. As stated in the Background, the network must normally always know in advance what RLC Data block that is received in what uplink allocation in order to be able to perform chase combining of the received blocks correctly including the header, when the RLC Data blocks are being retransmitted.

The uplink allocations are indicated including the starting position for the first uplink allocation, associated with the first RLC Data block, and then the position of the following blocks, given in relation to the position of the previous block. Due to size restrictions in the control message, the starting position of the first allocated uplink block is typically in relation to the position of the actual ack/nack message that includes the actual uplink allocation.

During a certain time the device listens to the EC-PACCH until it receives an ack/nack message addressed to it, or until a timer expires. If the timer expires, the connection, the so called Temporary Block Flow (TBF), is considered to have been lost. The device would then typically have to restart the transfer using the common control channel to initiate the establishment of an uplink TBF.

It has been identified to be a risk that the DL EC-PACCH message is not successfully received by the device. As described above, the device may or will release the TBF if it doesn't receive any ack/nack message on the DL EC-PACCH within a certain time. In that case it would need to restart the uplink transfer using the common control channels again. This requires additional resources and leads to a higher power consumption and an increased latency affectingly leading to a lower bitrate for the device.

Since the device is listening to the DL EC-PACCH for a certain time the network may send additional ack/nack messages during that time frame. If not all RLC Data blocks of the TBF have already been successfully received by the network, the ack/nack message will contain uplink allocations for, at least parts of, the remaining RLC Data blocks. Since the network must know in advance what specific RLC Data block, identified by a BSN number, that the device transmits in each uplink allocation, a problem is that the network then cannot include any of the uplink resources that have been allocated in the first message after a certain point in time. That is the case if the point in time of the first uplink allocation that was included in the first ack/nack message has already been reached, i.e. it cannot be allocated to the device using the additional ack/nack message, e.g. due to that the additional ack/nack message is sent to late in relation to where that first uplink allocation block takes place. If the device would receive such an additional ack/nack message it would then transmit in the allocated resources according to the ack/nack information in the message. The network, in turn, would then not know if the device heard the initial ack/nack message and is transmitting accordingly, or if it heard an ack/nack message that only included part of the initial allocation. The network would thus not be able to know in advance what RLC Data block that the device is transmitting in the different uplink allocations since that would depend on which of the ack/nack messages that the device has successfully decoded. Embodiments herein, discussed in the following, offer a solution to this identified problem.

FIG. 1 is a schematic block diagram schematically depicting an example of a wireless communication network 100 in which embodiments herein may be implemented. The wireless communication network 100 is typically a telecommunication network or system, such as a cellular communication network that may be a GSM network or a GSM based communication network. The wireless communication network 100 may support EC-GSM and it may comprise a RAN 101 part and a core network (CN) 102 part.

A radio network node 110 is shown comprised in the wireless communication network 100 and in the RAN 101. The radio network node 110 may be a radio network node as illustrated in the figure and may be or be comprised in a Base Station Subsystem (BSS), e.g. such supporting GSM/EDGE, for example when the when the wireless communication network 100 is a GSM network or a GSM based communication network. The radio network node 110 may be or comprise a base station 111, e.g. a Base Transceiver Station (BTS) of said BSS. The radio network node 110 may further comprise a controlling node 112 of a base station, which may control one or more base stations, including e.g. the base station 111, and may be a Base Station Controller (BSC) of said BSS.

The radio network node 110, or another network node, may serve and/or control and/or manage one or more wireless devices, e.g. MSs, such as a wireless device 120 shown in the figure, which are supported by and/or operative in the wireless communication network 100. The wireless device 120 may be of any type discussed herein, but is typically a MTC device and/or support EC-GSM and/or operate according to EC-GSM.

Further, a core network node 130 may be comprised in the wireless communication network 100 and in the CN 102. The first core network node 130 may be a SGSN when the wireless communication network 100 is a GSM network or a GSM based communication network.

The wireless device 120 may communicate with and/or via the first core network node over a radio network node, e.g. the network node 110. The CN 102 may provide access for the wireless device to an external network 140, e.g. the Internet. The wireless device 120 may thus communicate via the RAN 101 and the CN 102 with the external network 140. When the wireless communication network 100 is a GSM network or a GSM based communication network, such as one supporting EC-GSM, the access to the external network is typically via a Gateway GPRS Support Node (GGSN), such as the GGSN 131 illustrated in the figure.

The wireless communication network 100, including relevant nodes therein, such as the radio network node 110, and the wireless device 120, may support, and/or are configured to operate according to, Extended Coverage GSM (EC-GSM).

Attention is drawn to that FIG. 1 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as base stations, etc., as realized by the skilled person, but which are not shown herein for the sake of simplifying.

Figure 2:
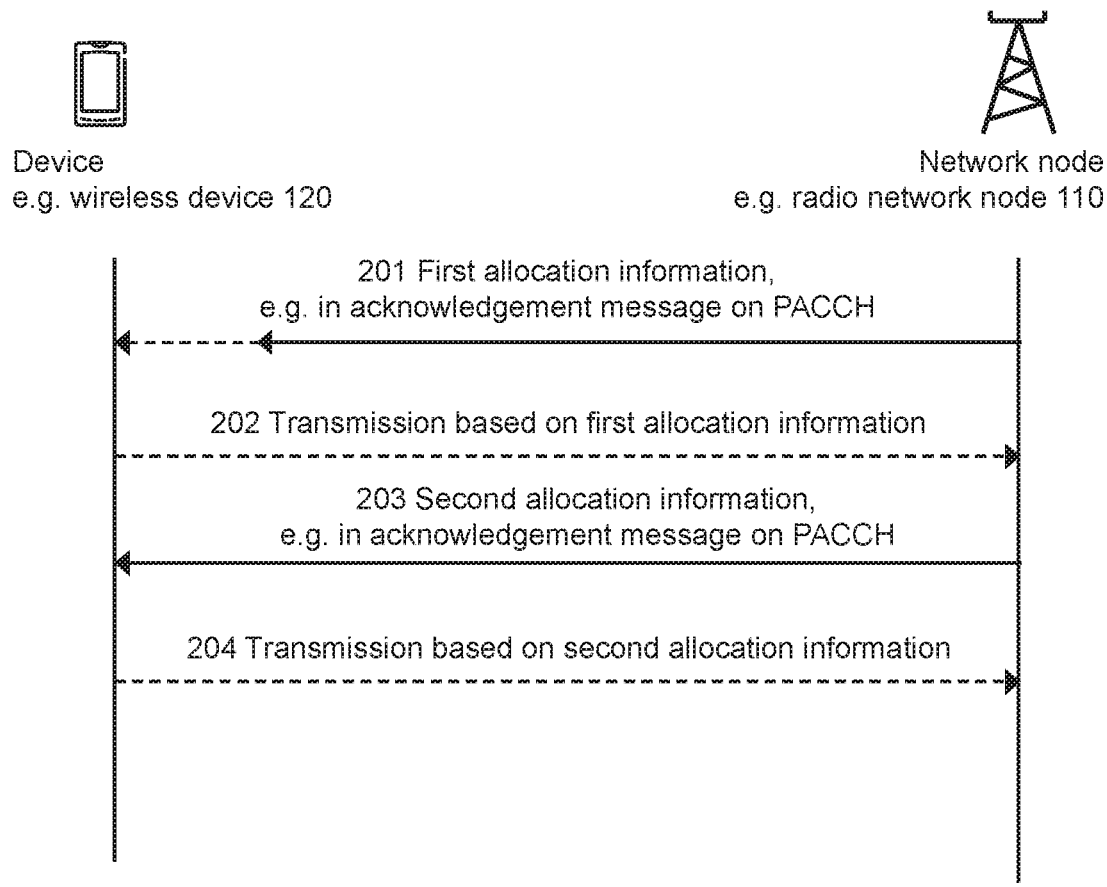

FIG. 2 depicts a combined signaling diagram and flowchart, which will be used to discuss embodiments herein. The involved nodes, as shown in the figure, is a device, in the following exemplified by the wireless device 120, and a network node comprised in a wireless communication network, in the following exemplified by the radio network node 110 and the wireless communication network 100.

The methods and actions discussed in the following are for managing allocation of uplink resources regarding remaining data blocks of an uplink transmission performed by device, e.g. the wireless device 120. The uplink transmission may correspond to a Temporary Block Flow (TBF). The data blocks may be Radio Link Control (RLC) data blocks.

The uplink resources being allocated for uplink transmission by the device. That is, as realized by the skilled person, the uplink resources are allocated by the wireless communication network 100, e.g. the radio network node 110, to be used in said uplink transmission by the wireless device 120.

The remaining data blocks are typically data blocks of the uplink transmission that previously were not received, or at least not successfully received, in the uplink by the wireless communication network 100, e.g. by the radio network node 110. That is, the remaining data blocks are typically a subset of a set of data blocks, which subset of data blocks may be data blocks of the set that the wireless communication network 100, e.g. the radio network node 110, could not acknowledge receipt for. Hence, uplink resources for the remaining data blocks may previously have been allocated and information identifying these uplink resources may previously have been sent to the wireless device 120.

The remaining data blocks may be associated, e.g. tagged, with identifiers, e.g. numbers, for identification. The numbers may correspond to the Block Sequence Numbers (BSN) mentioned herein.

The set of data blocks, and/or the remaining data blocks, may be associated with an order of combining, e.g. so that the blocks can be combined in a correct order with regard to the data they contain as a whole.

The numbers may be sequence numbers and may indicate said order of combining. The actions below may be taken in any suitable order and/or be carried out fully or partly overlapping in time when this is possible and suitable.

Action 201

The radio network node 110 sends, to the wireless device 120, first allocation information that identifies allocated uplink resources, i.e. uplink resources that have been allocated to the wireless device 120 for uplink transmission of said remaining data blocks. The wireless device 120 may thus receive, from the radio network node 110, said first allocation information. This is a one scenario, however embodiments herein are typically relevant for a scenario where the first allocation information and/or first acknowledgement message do not reach the wireless device 120, which is indicated by the dotted last part of the arrow for the present action in FIG. 2.

Sending of the first allocation information may be on a control channel, e.g. a Packet Associated Control Channel (PACCH), such as an Extended Coverage PACCH (EC-PACCH), that may be a control channel that has been set up for specific use with the wireless device 120.

The remaining data blocks are associated with, e.g. map to, the allocated uplink resources, respectively, for example so that there is a 1:1 mapping, such as one allocated uplink resource per remaining data block. In other words, each remaining data block is then associated with, e.g. maps to, a specific allocated uplink resource. The associations, or at least how the associations such as the mapping shall be made, may be implicit and is typically predefined or predetermined and may thus be explicitly or implicitly known in advance by the radio network node 110 and the wireless device 110. The associations may be based on, e.g. be determined from, the first allocation information. When the data blocks are associated with sequence numbers, such as mentioned above, the remaining data block with the lowest number may be associated with the uplink resource allocated closest in time, the data block with the second lowest number with the uplink resources allocated second closest in time with, etc.

The wireless device 120 may thus know from the association between the data blocks and the uplink resources, which remaining data block shall be transmitted using which allocated uplink resource. For example that the remaining data blocks shall be transmitted in a certain order based on their identifiers, e.g. sequence numbers, typically so that the remaining data blocks are sequentially transmitted according to the sequence numbers, such as in an increasing or decreasing order. Hence, the remaining data block with the lowest sequence number, may be transmitted using the uplink resource allocated closest in time, the remaining data block with the second lowest sequence number using the uplink resource allocated second closest in time, etc.

The first allocation information may be associated with, e.g. comprised in a first acknowledgement message that identifies the remaining data blocks by acknowledged and/or not acknowledged receipt of data blocks of said set. As should be understood, the remaining data block with the lowest number, such as mentioned above, may thus be the data block with the lowest not yet acknowledged number. As should also be understood, said associations between the remaining data blocks and the allocated uplink resources may be based on, e.g. accomplished by, said first acknowledgement message comprising the first allocation information, e.g. in combination with that it is predetermined that the device will transmit the remaining data blocks in a certain order, such as based on their identifiers, e.g. sequence numbers. For example so that the oldest remaining data block, e.g. the remaining data block with the lowest sequence number, will be transmitted using the uplink resource allocated closest in time, the remaining data block with the second lowest sequence number using the uplink resource allocated second closest in time, etc.

Action 202

If the wireless device 120 receives the first allocation information and/or first acknowledgement message, the wireless device 120 may send, such as transmit, in the uplink to the radio network node 110, in response to, such as based on or according, to the received first allocation information and/or first acknowledgement message. The radio network node 110 may accordingly receive, what is being sent in the uplink, i.e. receive the transmission, based on the first allocation information, from the wireless device 120.

Action 203

The radio network node 110 sends, to the wireless device 120, another, second, allocation information that identifies one or more of said allocated uplink resources. The wireless device 120 receives, from the network node, said second, allocation information.

Also sending of the second allocation information may be on a control channel, e.g. a PACCH, such as an EC-PACCH, that may be a control channel that has been set up for specific use with the wireless device 120.

In other words, one or more of the same uplink resources allocated to the wireless device 120 for uplink transmission of one or more remaining data blocks are again identified and information about these uplink resources is again sent to the wireless device 120. In yet other words, one or more allocated uplink resources identified by the second allocation information are the same as identified by the first allocation information.

The second allocation information also indicates, or identifies, one or more of the remaining data blocks that the device shall exclude, i.e. not transmit using said one or more uplink resources.

This enable preservation of the associations between remaining data blocks and allocated uplink resources, i.e. of the associations associated with, e.g. that followed from, the first allocation information and/or that were valid for the allocated uplink resources identified by the first allocation information. The associations are e.g. enabled to be preserved in cases where they else, such as conventionally, would be lost. Associations may e.g. be lost in response to that the wireless device 120 would or could not use an allocated uplink resource since it is too late. Therefore, conventionally, the wireless device 120 would replace the data block associated with that allocated resource with a first allocated uplink resource possible to use. The wireless device may conventionally operate so that the oldest data blocks, e.g. those with lowest sequence number, always are transmitted first. This is normally a desirable way of operation and may be desirable in response to the first allocation information, but can cause problem in response to the second allocation information. In response to the second allocation information, without excluding data blocks as in embodiment herein, a remaining data block would risk to suddenly be associated with an allocated resource that, for the first allocation information, was associated with another remaining data block, e.g. with the second lowest sequence number. Hence, the same data block would be associated with two different uplink resources and the previous association would have been changed. This would cause problems for the network and combining of data, as should be realized and according to was discussed above in the Background, and may in particular cause problems in the case of EC-GSM, but can thus be avoided thanks to embodiments herein.

The one or more remaining data blocks that shall be excluded should thus typically correspond to those uplink resources that are allocated first in time according to the first allocation information. The one or more remaining data blocks that shall be excluded are typically such associated with allocated uplink resources that are no longer valid, e.g. that are too close in time to be used, or in other words, the exclusion is made so that only remaining data blocks associated with allocated uplink resources that can be used remain included.

Also the second allocation information may be associated with, e.g. comprised in, an acknowledgement message similar to as above, such as in a second acknowledgement message, that identifies remaining data blocks by acknowledged and/or not acknowledged receipt of data blocks.

In some embodiments, the one or more remaining data blocks that shall be excluded are preferably indicated, or identified, by means of an offset indicator, typically in the form of a offset value, such as an integer, that indicates the offset as a number data blocks that shall be excluded. The offset indicator may be comprised in a certain field that may have the only purpose to comprise the indictor, e.g. named an Offset field or similar. A zero offset and/or that the offset indicator and/or said field is absent, typically means that there should be no exclusion. An offset that is an integer n, greater than zero, denoting n data blocks to be excluded, may thus indicate to the device that e.g. the n first or last remaining data blocks according to a sequence, such as the oldest, or the n remaining data blocks with the lowest or highest sequence number, shall be excluded.

The offset indicator is typically set so that all remaining data blocks associated with allocated uplink resources that are too close in time to be used are excluded, or in other words, so that only remaining data blocks associated with allocated uplink resources that can be used are included.

The offset indicator is typically sent together with the second allocation information, e.g. in the second acknowledgement message. The first and second acknowledgement messages, or such acknowledgement messages in general, may comprise an offset indicator as discussed above, but that may be set to different values. For the first acknowledgement message it may e.g. be set to zero, or the offset indicator and/or the field may be excluded, since no offset should be applied in that case.

In some embodiments, the second acknowledgement message comprises same acknowledgement information as in the first acknowledgement message. The second allocation information, however, may be different than the first allocation information, e.g. since one or more allocated uplink resources according to the first allocation information may no longer be used, e.g. since they are no longer valid, e.g. that are too close in time to be used. In these embodiments, the second acknowledgement message may be sent independent on any response in the uplink on the sent first allocation information.

In some embodiments, the second allocation information is sent in response to that one or more remaining data blocks that were expected to be received in the uplink according to the first allocation information, were not received in the uplink, at least not successfully received. Allocated uplink resources associated with these one or more remaining data blocks may be identified by the second allocation information. The second allocation information may also here be different than the first allocation information, e.g. since one or more allocated uplink resources according to the first allocation information may no longer be used, e.g. since they are no longer valid, e.g. that are too close in time to be used, or may already have been used.

The second acknowledgement message may identify said one or more remaining data blocks expected to be received, e.g. by acknowledged and/or not acknowledged receipt of data blocks, i.e. in a similar manner as for the first acknowledgement message but although typically not acknowledging the exact same remaining data blocks. The second acknowledgement message may thus in these embodiments comprises different acknowledgement information than in the first acknowledgement message, typically different in that that more of the remaining data blocks are acknowledged.

The second allocation information may further identify one or more additional uplink resources for allocation, i.e. in addition to said one or more of uplink resources already identified by the first allocation information. These additional uplink resources may be associated with remaining data blocks that in the first allocation were associated with other allocated uplink resources but which now are no longer valid, e.g. that are too close in time to be used.

In some embodiments, the one or more remaining data blocks that shall be excluded are preferably indicated, or identified, by a time indicator, e.g. corresponding to a negative delay, that may indicate or identify the starting point or starting time for the earliest allocated uplink resource according to the first allocation information. The device may use knowledge about said starting point or starting time to determine which remaining data blocks to transmit using the allocated uplink resources that are still possible to use, e.g. that are not too late to use.

Use of the time indicator may be considered an alternative to using the offset indicator as discussed above and may provide a corresponding effect.

Also for these embodiments, the second acknowledgement message may comprise the same acknowledgement information as in the first acknowledgement message.

The time indicator is typically sent together with the second allocation information, e.g. in the second acknowledgement message. The first and second acknowledgement messages, or such acknowledgement messages in general, may comprise time indicators as discussed above, but that may be set to different values. For the first acknowledgement message the time may indicate, e.g. by being set to a to a first value, a time that the device can use for transmission, e.g. indicating the starting point or starting time for the earliest allocated uplink resource according to the first allocation information. For the second acknowledgement message, the time may indicate, e.g. by being set to a to a second value that may correspond of a negative aely. such as be a negative value, and indicates a time that the device cannot use for transmission, e.g. indicating a starting point or starting time for the earliest allocated uplink resource according to the first allocation information but that may no longer be used or valid, e.g. that is too close in time to be used.

Hence this may be considered to correspond to another way of informing the wireless device 120 about what allocated uplink resources, and associated remaining data blocks, that still may be used for uplink transmission.

Action 204

The wireless device 120 may, in response to, such as based on or according, to the received second allocation information and/or second acknowledgement message in action 203, send, such as transmit, in the uplink to the radio network node 110. Hence, the radio network node 110 may accordingly receive what is being sent in the uplink, i.e. receive the transmission, based on the second allocation information, from the wireless device 120.

Some further example of embodiments herein and details thereof will now follow.

In a first example of embodiments, information is included in an ack/nack message, which includes an uplink allocation, about an RLC Data block offset that shall be applied by the device, e.g. the wireless device 120, when transmitting on the uplink allocations. This ack/nack message is an example of a message that comprises the second allocation information discussed above and may correspond to the second acknowledgement message discussed above. The RLC Data block offset, below simply referred to as offset or offset parameter, is an example of the offset indicator discussed above.

The offset may indicate with what RLC Data block the wireless device 120 shall start its transmission. Without an offset, or with the RLC Data block offset=0, the wireless device 120 should start with the oldest RLC Data block that is available for transmission, i.e. the one that typically has the lowest not yet acknowledged absolute BSN, in the first uplink allocation. In the second uplink allocation it shall then include the second oldest RLC Data block, and so on.

With an RLC Data block offset=n, where n>0, the wireless device 120 shall instead start with the (n+1)th oldest RLC Data block in the first uplink allocation and then continue with the (n+2)th oldest RLC Data block in the second uplink allocation, and so on. Blocks not transmitted due to offsets>0 may be allocated resources in a later ack/nack message.

As an example, a device, e.g. the wireless device 120 has 5 RLC Data blocks that it need to transmit as part of its uplink TBF. The RLC Data blocks thus have BSNs from 0 to 4. Five uplink allocation blocks, including repetitions, are included in the an allocation message. The wireless device 120 may then then, i.e. in response to receipt of the allocation message, transmits the blocks accordingly, starting with BSN=0, then BSN=1, and so on up to BSN=4. In the example, the network, e.g. wireless communication network 100, or more particularly e.g. the radio network node 110, successfully receives only the first RLC Data block, with BSN=0. It thus sends a first ack/nack message acknowledging the reception of BSN=0 and indicating that the other blocks are not received. The first ack/nack message may thus comprise information corresponding to the first allocation information discussed above in connection with FIG. 2. Four uplink allocations are included in the first ack/nack message in order for the device to transmit the remaining RLC Data blocks, starting with BSN=1 for the first allocation, then BSN=2, and so on up to BSN=4.

In order to increase the probability that the wireless device 120 successfully receives at least one ack/nack message, the wireless communication network 100, e.g. the radio network node 110, may transmit an additional, second ack/nack message containing the same acknowledgement information as the first ack/nack message. However, due to that the first uplink allocation included in the first ack/nack message may not be addressed anymore, since it may no longer be available, e.g. due to that the point in time for the first uplink allocation block is already ongoing/passed, only three uplink allocations may be included in the additional, second ack/nack message, which are the same allocated resources as the last three uplink allocations of the first ack/nack message. In order to have the wireless device 120 transmit the same RLC Data block in those three uplink allocations, independent of which ack/nack message the wireless device 120 successfully received, the wireless communication network 100, e.g. the radio network node 110, sets the RLC Data block offset=1. The second ack/nack message may thus comprise information corresponding to the second allocation information discussed above in connection with FIG. 2. If the wireless device 120 successfully receives the additional ack/nack message it will then receive three uplink allocations and, based on the RLC Data block offset parameter, transmit its RLC Data blocks starting with BSN=2, followed by BSN=3 and then BSN=4 in the last uplink allocation. This then corresponds to the same RLC Data blocks that would be included in those uplink allocations if the wireless device 120 would have received the first ack/nack message.

The network can thus first transmit a first ack/nack message with the corresponding uplink allocation, followed by one or more additional ack/nack messages, thus including a second ack/nack message, which then can be transmitted even during the time of the uplink allocation of the first ack/nack message and still point at the remaining uplink allocations and inform the device about what RLC Data block to transmit in what uplink allocation.

Figure 3:
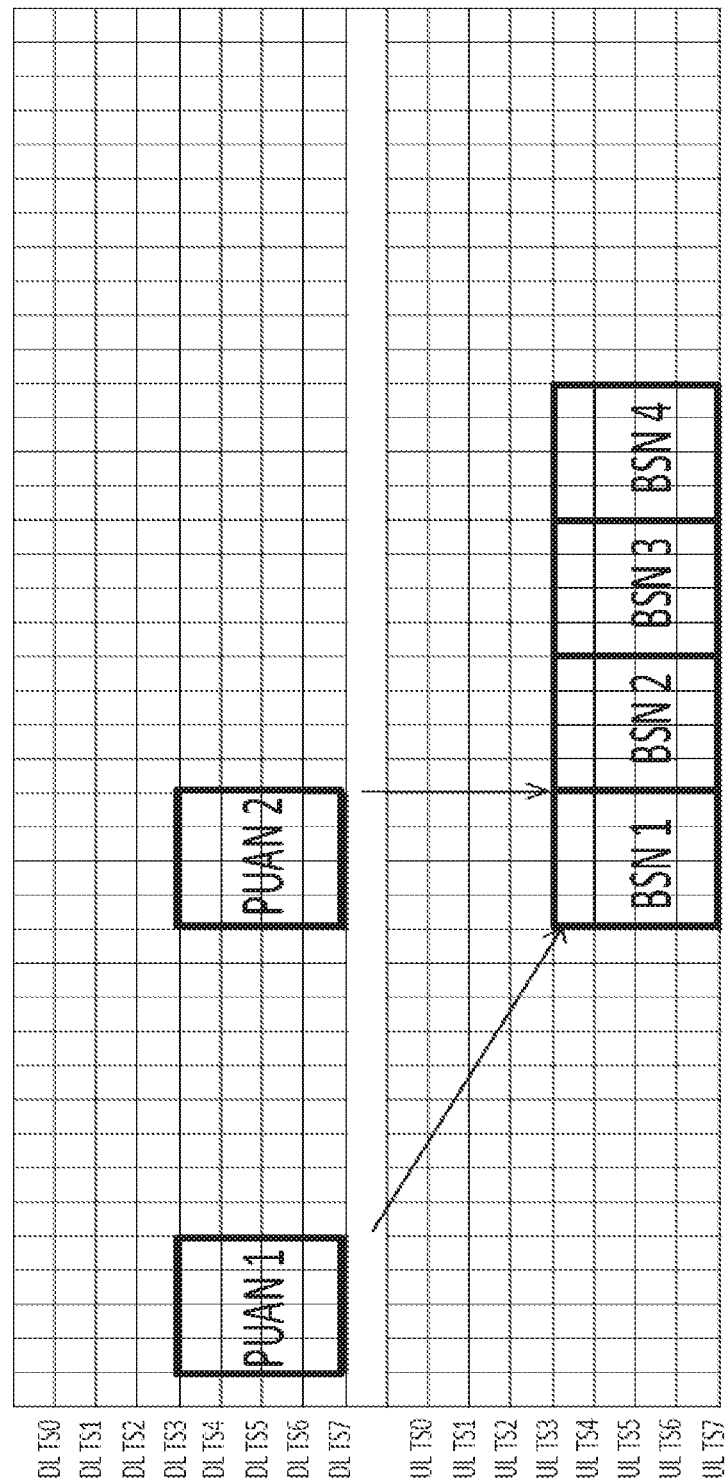

FIG. 3 schematically illustrates an example of transmission of an additional, second DL PACCH message, i.e. a message on a DL PACCH, here a second Packet Uplink Ack/Nack (PUAN2) message that is following a first DL PACCH message, here a first PUAN message (PUAN1). As can be seen, the second DL PACCH message is sent during ongoing uplink allocation according to the first DL PACCH message. The shown example is for a device, e.g. the wireless device 120, when operating according to a EC-GSM Coverage Class (CC) 3 for which the allocated blocks are mapped over 4 time slots and 4 TDMA frames.

In FIG. 3, a BSS, e.g. the radio network node 110, may thus first have sent a first ack/nack message (PUAN1) with negative acknowledgement as well as with uplink allocation for BSN 1, 2, 3, 4. The BSS, e.g. the radio network node 110, may also pre-emptively have sent an additional, second ack/nack message (PUAN2) for BSN 2, 3 and 4. That is, as can be seen, the BS sent PUAN2 before it could have received the first RLC data block identified by BSN1.

Figure 4:
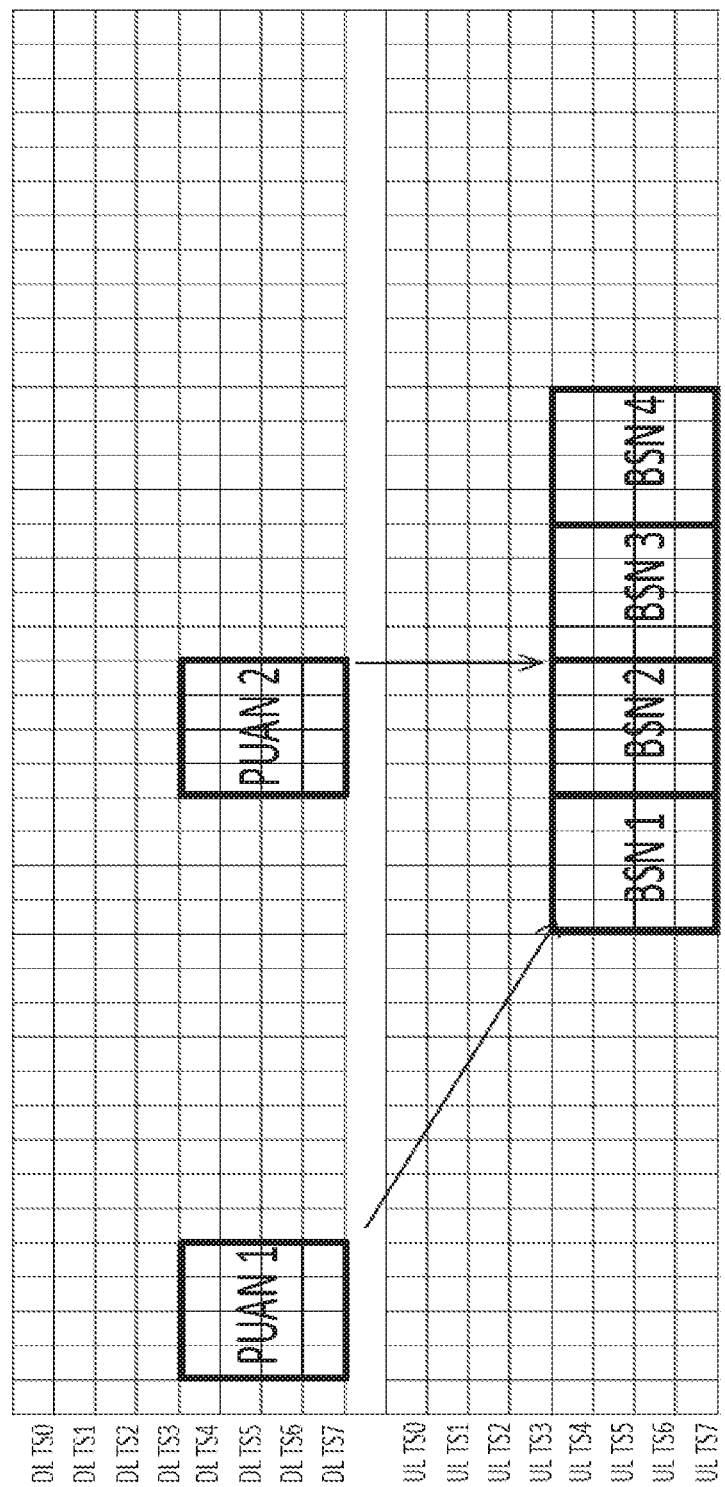

FIG. 4 schematically illustrates another example of transmission of an additional, second DL PACCH message, here a second Packet Uplink Ack/Nack (PUAN2), in response to detection of a lack of uplink transmission from a device, e.g. the wireless device 120. For example, as can be seen, the BS sent PUAN2 after it first could have detected that no RLC data block identified by BSN was received according to the uplink allocation for that RLC data block.

In a second example of embodiments, the network, e.g. the wireless communication network 100, may make a decision to transmit an additional ack/nack message based on that it has not successfully received any uplink transmission in one, or several, of the uplink allocations that were included in the first ack/nack message. The additional ack/nack message may then include the remaining uplink allocations from the first ack/nack message. This thus corresponds to an example as illustrated in FIG. 4, where the BSS, e.g. the radio network node 110, may not have received anything on the uplink corresponding to BSN1 and thereby determined that the device, e.g. the wireless device 120, may have been unsuccessful in its reception of the first ack/nack message, i.e. PUAN1. The radio network node 110 may therefore have sent said other, second ack/nack message, i.e. PUAN 2, in order not to further waste uplink resources. Since the failure to successfully receive the uplink transmission, corresponding to BSN1 in the figure, could be due to problems in the uplink transmission, the wireless device 120 may anyway have successfully received PUAN1. The additional ack/nack message should therefore include an RLC Data block offset value in order to indicate to the wireless device 120 what BSN numbers to include in the uplink allocations.

As a possible addition, the wireless communication network 100 may include one or more additional uplink allocation(s) in an additional ack/nack message, occurring later than the last one included in the first ack/nack message, so that the wireless device 120 e.g. can transmit the oldest RLC Data block in that block if it successfully receives/act on that message. In case the wireless communication network 100 may then receive a transmission from the wireless device 120 in the first uplink allocation of the first ack/nack message, and it thereby know that these additional allocations have not been received by the wireless device 120. They could then, in that case, be considered as not being allocated by the network and could thus e.g. be allocated for other purposes.

In a third example of embodiments, an additional ack/nack messages, such as disclosed above, may contain the same full uplink allocation as the first ack/nack message, where the starting point in time of one, or more, of the uplink allocation blocks may already have passed. The additional ack/nack message may then include a negative delay in time in order to point out the starting point for the first uplink allocation included in the first ack/nack message. The wireless device 120 may thereby be informed about the uplink allocation(s) that have already occurred and, even though it is no longer possible for the wireless device 120 to transmit in that/those uplink allocation(s) it may use that information to determine what RLC Data block to include in the following uplink allocation(s), where the wireless device 120 is still able to transmit.

In a fourth example of embodiments, the wireless communication network 100, e.g. the radio network node 110, may:

1. Store received buffers corresponding to the allocation in an ack/nack message, which should be done just prior to and not overlapping with the first uplink allocation.

2. Determine how many uplink transmission opportunities that were used by the wireless device 120. And subsequently which ack/nack messages the wireless device 120 is acting on.

3. Soft combine the received buffers according to outcome of step 2 and update a receive status or received sequence numbers, e.g. BSNs.

These embodiments may be considered to relate to a "detection mechanism" that leads to that the wireless communication network 100, or more specifically the radio network node 110, such as BSS, can detect what BSN that is received by the wireless device 120 in each specific uplink allocation. This may be done based on that the wireless communication network 100, e.g. the radio network node 110, detects in what uplink allocations anything at all seems to be received, and thus have been transmitted by the wireless device 120. Thereby the wireless communication network 100 may know which acknowledgment/assignment message the wireless device 120 has successfully received.

As an example with reference to FIG. 2. If the BSS, i.e. the radio network node 110, detects uplink transmission on all four uplink allocations then the radio network node 110 may know that the wireless device 120 heard the first ack/nack message implying that the uplink transmissions correspond to BSN 1, 2, 3, and 4. Alternatively, if the radio network node 110 would only detect uplink transmission on the two last allocations, then the radio network node 110 may know that the device is transmitting based on, e.g. according to, instructions in the second ack/nack message. The wireless device 120 may then transmit an oldest outstanding BSNs, i.e. in this case BSN 1 and 2.

Advantages resulting from or that are enabled by embodiments herein include for example:

Improved success rate for EC-GSM uplink TBFs, i.e. fewer blocks will be lost due to unsuccessful reception of downlink RLC/MAC control messages, typically on the EC-PACCH.

Less waste of uplink resources in case of lost ack/nack messages since additional ack/nack messages, with uplink allocations, can be sent pointing to and thereby enabling to reuse part of the uplink resources allocated in an earlier message.

Reduced latency and increased net bitrate.

Figure 5:
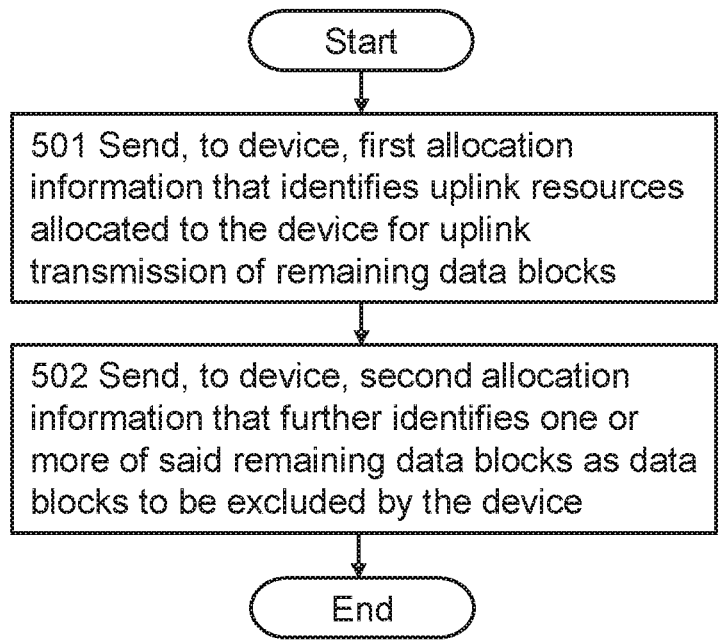

FIG. 5 is a flow chart schematically illustrating embodiments of a first method, performed by a network node, in the following exemplified by the radio network node 110, comprised in a wireless communication network, e.g. the wireless communication network 100. The first method is for managing allocation of uplink resources regarding remaining data blocks of an uplink transmission performed by a device, in the following exemplified by the wireless device 120. The wireless communication network 100 may be a GSM network, the data blocks may be RLC data blocks, and the uplink transmission may be part of a TBF.

The first method comprises the following actions, which actions may be taken in any suitable order and/or be carried out fully or partly overlapping in time when this is possible and suitable.

Action 501

The radio network node 110 sends, to the wireless device 120), first allocation information that identifies uplink resources that have been allocated to the wireless device 120 for uplink transmission of said remaining data blocks. The remaining data blocks being associated with the allocated uplink resources, respectively.

The wireless device 120, if receiving the first allocation information, can thus know from the associations between the data blocks and the allocated uplink resources, which remaining data block shall be transmitted using which allocated uplink resource.

This action may fully or partly correspond to action 201 as described above.

Action 502

The radio network node 110 further sends, to the wireless device 120, a second allocation information that identifies one or more of said allocated uplink resources identified by the first allocation information and that have been allocated for uplink transmission of said remaining data blocks. Additionally, said second allocation information further identifies one or more of said remaining data blocks as data blocks to be excluded by the wireless device 120.

Typically the associations between the remaining data blocks and the allocated uplink resources are predefined and based on the first allocation information and the second allocation information.

The second allocation information may be comprised in a second acknowledgement message that identifies the remaining data blocks by acknowledged and/or not acknowledged receipt of data blocks.

In some embodiments, the one or more remaining data blocks to be excluded are associated with one or more of the uplink resources that have been allocated first in time, i.e. according to the allocation information.

Further, in some embodiments, the one or more remaining data blocks to be excluded are identified by means of an offset indicator that is sent together with the second allocation information to the wireless device 120.

In some embodiments, the remaining data blocks are associated with identifiers, respectively, such that each remaining data block is identified by a respective identifier. The wireless device 120 can thereby e.g. know from the associations between the data blocks and the allocated uplink resources that the remaining data blocks are to be transmitted in a certain order based on their identifiers. The identifiers are typically sequence numbers. The wireless device 120 can thereby know from the associations between the data blocks and the allocated uplink resources that there is a sequential order and the remaining data blocks are to be sequentially transmitted according to the sequence numbers. In this case and when the one or more remaining data blocks to be excluded are identified by means of an offset indicator that is sent together with the second allocation information to the wireless device 120, the offset indicator may be in the form of an integer value that indicates a number of data blocks to be excluded. It can thereby be indicated to the wireless device 120 that said number of the remaining data blocks with e.g. the lowest or highest sequence numbers are to be excluded.

This action may fully or partly correspond to action 203 as described above.

Figure 6:
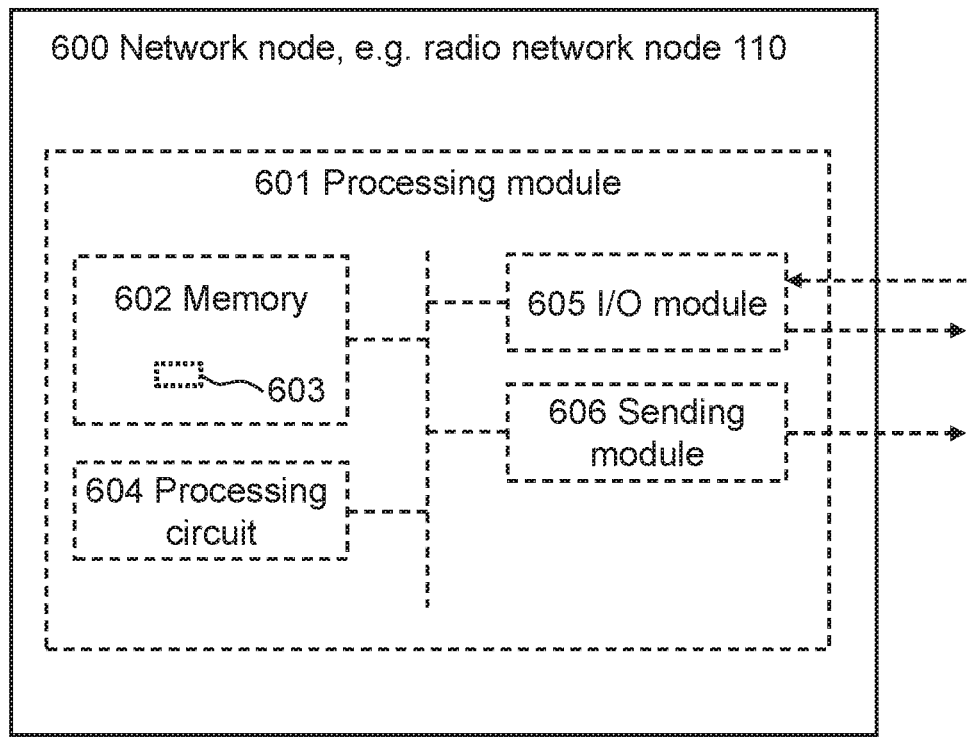

FIG. 6 is a schematic block diagram for illustrating embodiments of how a network node 600, that may be the network node discussed above, e.g. the radio network node 110, may be configured to perform the first method and actions discussed above, e.g. in connection with FIGS. 2 and 5.

Hence, the network node 600 may comprise one or more of the following:

A processing module 601, such as a means, one or more hardware modules, including e.g. one or more processors, and/or one or more software modules for performing said method and/or actions.

A memory 602, which may comprise, such as contain or store, a computer program 603. The computer program 603 comprises 'instructions' or 'code' directly or indirectly executable by the network node 600 so that it performs the said method and/or actions. The memory 602 may comprise one or more memory units and may be further be arranged to store data, such as configurations and/or applications involved in or for performing functions and actions of embodiments herein.

A processing circuit 604 as an exemplifying hardware module and may comprise or correspond to one or more processors. In some embodiments, the processing module 601 may comprise, e.g. 'is embodied in the form of' or 'realized by' the processing circuit 604. In these embodiments, the memory 602 may comprise the computer program 603 executable by the processing circuit 604, whereby the network node 600 comprising it is operative, or configured, to perform said method and/or actions.

An Input/Output (I/O) module 605, configured to be involved in, e.g. by performing, any communication to and/or from other units and/or nodes, such as sending and/or receiving information to and/or from other external nodes or devices. The I/O module may 605 be exemplified by an obtaining, e.g. receiving, module and/or a sending module, when applicable.

The network node 600 may also comprise other exemplifying hardware and/or software module(s), which module(s) may be fully or partly implemented by the processing circuit 604. For example, the network node 600 may further comprise a sending module 606.

The network node 600 and/or the processing module 601 and/or the processing circuit 604 and/or the I/O module 605 and/or the sending module 606 are operative, or configured, to send said first allocation information to the device, e.g. the wireless device 120.

Further, the network node 600 and/or the processing module 601 and/or the processing circuit 604 and/or the I/O module 605 and/or the sending module 606 are operative, or configured, to send said second allocation information to the device, e.g. the wireless device 120, i.e. the said second allocation information that further identifies one or more of said remaining data blocks as data blocks to be excluded.

Figure 7:
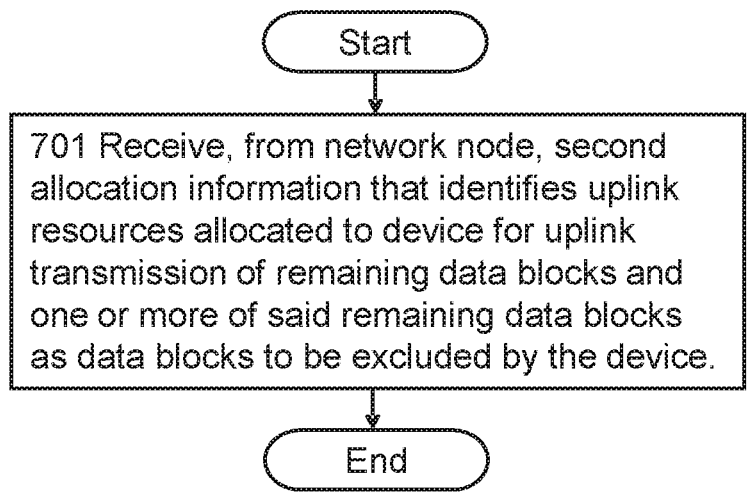

FIG. 7 is a flow chart schematically illustrating embodiments of a second method, performed by a device, in the following exemplified by the wireless device 120. The second method is for managing allocation of uplink resources regarding remaining data blocks of an uplink transmission performed by the wireless device 120 in a wireless communication network, in the following exemplified by the wireless communication network 100. The wireless communication network 100 may be a GSM network, the data blocks may be RLC data blocks, and the uplink transmission may be part of a TBF.

The second method comprises the following actions, which actions may be taken in any suitable order and/or be carried out fully or partly overlapping in time when this is possible and suitable.

Action 701

The wireless device 120 receives, from a radio network node 110, a second allocation information. The second allocation information identifies uplink resources that have been allocated to the wireless device 120 for uplink transmission of said remaining data blocks. The remaining data blocks being associated with the allocated uplink resources, respectively. The second allocation information further identifies one or more of the remaining data blocks as data blocks to be excluded by the wireless device 120.

The wireless device 120 can thus know from the associations between the data blocks and the allocated uplink resources, which remaining data block shall be transmitted using which allocated uplink resource.

As realized from the method and actions performed by the radio network node 110, as described above, the second allocation information thus typically identifies one or more of allocated uplink resources that was first identified by first allocation information transmitted by the radio network node 110, but which first allocation information was not received by the wireless device 120.

Typically the associations between the remaining data blocks and the allocated uplink resources are predefined and based on the second allocation information.

The second allocation information may be comprised in a second acknowledgement message that identifies the remaining data blocks by acknowledged and/or not acknowledged receipt of data blocks.

In some embodiments, the one or more remaining data blocks to be excluded are associated with one or more of the uplink resources that have been allocated first in time, i.e. according to the second allocation information and thus also by the first allocation information although it typically has not been received by the wireless device 120. Further, in some embodiments, the one or more remaining data blocks to be excluded are identified by means of an offset indicator that is sent together with the second allocation information to the wireless device 120.

In some embodiments, the remaining data blocks are associated with identifiers, respectively, such that each remaining data block is identified by a respective identifier. The wireless device 120 can thereby e.g. know from the associations between the data blocks and the allocated uplink resources that the remaining data blocks are to be transmitted in a certain order based on their identifiers. The identifiers are typically sequence numbers. The wireless device 120 can thereby know from the associations between the data blocks and the allocated uplink resources that there is a sequential order and the remaining data blocks are to be sequentially transmitted according to the sequence numbers. In this case and when the one or more remaining data blocks to be excluded are identified by means of an offset indicator that is sent together with the second allocation information to the wireless device 120, the offset indicator may be in the form of an integer value that indicates a number of data blocks to be excluded. It can thereby be indicated to the wireless device 120 that said number of the remaining data blocks with e.g. the lowest or highest sequence numbers are to be excluded.

This action may fully or partly correspond to action 203 as described above.

Figure 8:
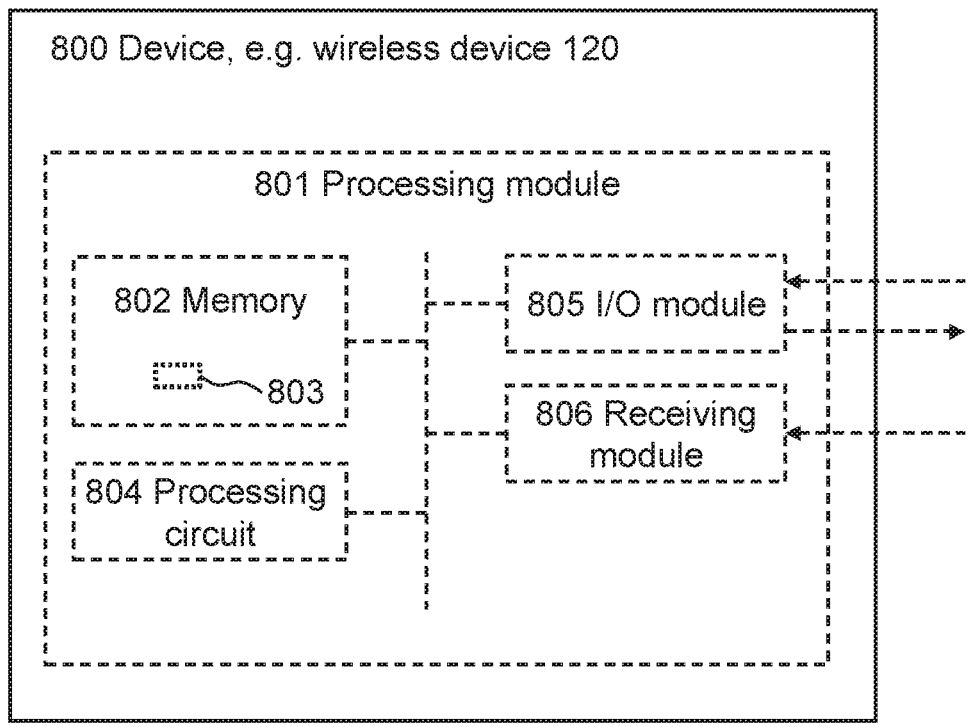

FIG. 8 is a schematic block diagram for illustrating embodiments of how a device 800, that may be device discussed above, e.g. the wireless device 120, may be configured to perform the second method and actions discussed above, e.g. in connection with FIGS. 2 and 7.

Hence, the device 800 may comprise one or more of the following:

A processing module 801, such as a means, one or more hardware modules, including e.g. one or more processors, and/or one or more software modules for performing said method and/or actions.

A memory 802, which may comprise, such as contain or store, a computer program 803. The computer program 803 comprises 'instructions' or 'code' directly or indirectly executable by the device 800 so that it performs the said method and/or actions. The memory 802 may comprise one or more memory units and may be further be arranged to store data, such as configurations and/or applications involved in or for performing functions and actions of embodiments herein.

A processing circuit 804 as an exemplifying hardware module and may comprise or correspond to one or more processors. In some embodiments, the processing module 801 may comprise, e.g. 'is embodied in the form of' or 'realized by' the processing circuit 804. In these embodiments, the memory 802 may comprise the computer program 803 executable by the processing circuit 804, whereby the device 800 comprising it is operative, or configured, to perform said method and/or actions.

An Input/Output (I/O) module 805, configured to be involved in, e.g. by performing, any communication to and/or from other units and/or nodes, such as sending and/or receiving information to and/or from other external nodes or devices. The I/O module may 805 be exemplified by an obtaining, e.g. receiving, module and/or a sending module, when applicable.

The device 800 may also comprise other exemplifying hardware and/or software module(s), which module(s) may be fully or partly implemented by the processing circuit 604. For example, the device 800 may further comprise a receiving module 806.

The device 800 and/or the processing module 801 and/or the processing circuit 804 and/or the I/O module 805 and/or the receiving module 806 are operative, or configured, to receive said second allocation information from the network node, e.g. the radio network node 110. Said second allocation information thus identifying uplink resources that have been allocated to the device 800 for uplink transmission of said remaining data blocks. The remaining data blocks being associated with the allocated uplink resources, respectively. Which second allocation information further identifies one or more of the remaining data blocks as said data blocks to be excluded by the device 800.

Figure 9A:
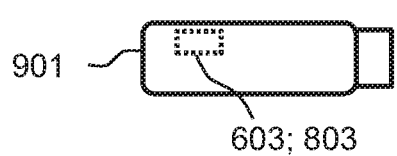
FIGS. 9a-c are schematic drawings illustrating embodiments relating to computer programs and computer readable media to cause network node and/or the device to perform the first method and/or second method, respectively.
Figure 9B:
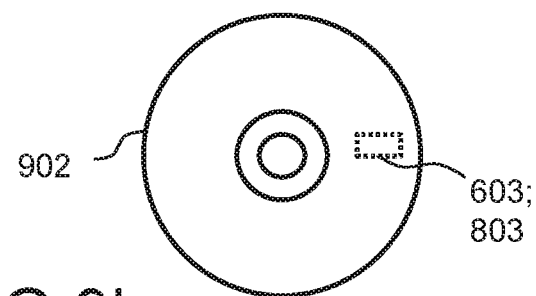
Figure 9C:
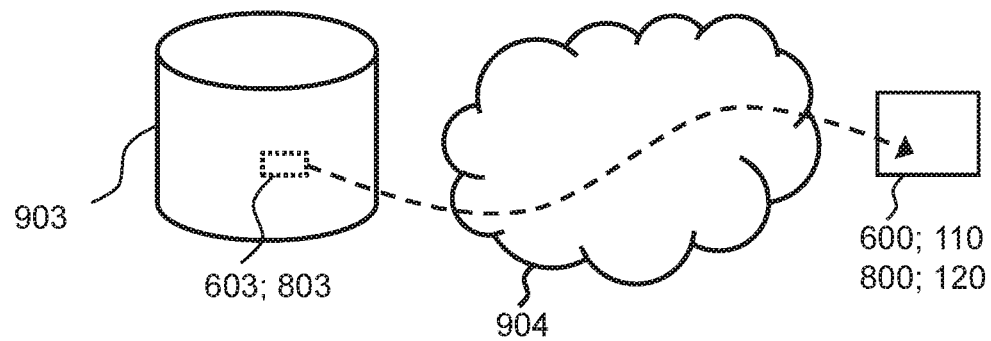

FIGS. 9a-c are schematic drawings illustrating embodiments relating to a computer program that may be any one of the computer programs 603 and 803, and that comprises instructions that when executed by the respective processing circuit 604, 804 causes the network node 600 or the device 800, comprising it to perform the respective method as described above.

In some embodiments there is provided a computer program product, i.e. a data carrier, comprising a computer-readable medium and the computer program stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 901 as in FIG. 9*a*, a disc storage medium 902 such as a CD or DVD as in FIG. 9*b*, a mass storage device 903 as in FIG. 9*c*. The mass storage device 903 is typically based on hard drive(s) or Solid State Drive(s) (SSD). The mass storage device 903 may be such that is used for storing data accessible over a computer network 905, e.g. the Internet or a Local Area Network (LAN).

Each computer program 603, 803 may furthermore be provided as a pure computer program or comprised in a file or files. The file or files may be stored on the computer-readable medium and e.g. available through download e.g. over the computer network 905, such as from the mass storage device 903 via a server. The server may e.g. be a web or File Transfer Protocol (FTP) server. The file or files may e.g. be executable files for direct or indirect download to and execution on the respective node for carrying out the respective method, e.g. by the processing circuit 604 or 804, or may be for intermediate download and compilation to make them executable before further download and execution causing the node(s) to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first node and the second node to be configured to and/or to perform the above-described methods, respectively.

Identification by any identifier herein may be implicit or explicit. The identification may be unique in the wireless communication network 100 or at least in a part or some area thereof.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self Organizing Network (SON) node, positioning node etc.

The term "radio network node" as used herein may as such refer to any type of network node serving a wireless device and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "wireless device" as used herein, may as such refer to any type of wireless device arranged to communicate with a radio network node in a wireless, cellular and/or mobile communication system, such as the wireless communication network 100, and may thus be referred to as a wireless communication device. Examples include: target devices, device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may as such refer to any type of network node or wireless device, such as described above.

Note that with regard to the downlink, the term "transmitter" may be used herein to refer to a radio network node, e.g. base station, and the term "receiver" may refer to a wireless device.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology such as first network node, second network node, first base station, second base station, etc., that may have been used herein, as such should be considering non-limiting and the terminology as such does not imply a certain hierarchical relation. Without any explicit information in the contrary, naming by enumeration should be considered merely a way of accomplishing different names.

The invention claimed is:

1. A method, performed by a network node comprised in a wireless communication network, for managing allocation of uplink resources regarding a plurality of data blocks of an uplink transmission performed by a device, the method comprising:

sending, to the device, first allocation information that identifies uplink resources that have been allocated to the device for uplink transmission of said plurality of data blocks, the plurality of data blocks being associated with first allocated uplink resources, respectively; and sending, to the device, a second allocation information that identifies at least one of said first allocated uplink resources identified by the first allocation information and that have been allocated for uplink transmission of said plurality of data blocks, said second allocation information further excluding association of one data block of the plurality of data blocks with a second uplink resource allocation by identifying at least one of said data block of the plurality data blocks to be excluded by the device and preserving the association of the other data blocks that were not excluded with the second allocated uplink resources.

2. The method of claim 1, wherein the at least one remaining data block to be excluded is associated with at least one of the uplink resources that have been allocated first in time.

3. The method of claim 1, wherein the at least one remaining data block to be excluded is identified by an offset indicator that is sent together with the second allocation information to the device.

4. The method of claim 1, wherein the associations between the remaining data blocks and the allocated uplink resources are predefined and based on the first allocation information and second allocation information.

5. The method of claim 1, wherein the remaining data blocks are associated with identifiers, respectively, such that each remaining data block is identified by a respective identifier.

6. The method of claim 5, wherein the identifiers are sequence numbers.

7. A method, performed by a device, for managing allocation of uplink resources regarding a plurality of data blocks of an uplink transmission performed by the device in a wireless communication network, the method comprising:
receiving, from a network node comprised in the wireless communication network, allocation information that identifies uplink resources that have been allocated to the device for uplink transmission of said plurality of data blocks, the plurality of data blocks being associated with first allocated uplink resources, respectively, and which allocation information further excludes association of one data block of the plurality of data blocks with a second uplink resource allocation by identifying at least one of the data block of the plurality of data blocks to be excluded by the device and preserving the association of the other data blocks that were not excluded with the second allocated uplink resources.

8. The method of claim 7, wherein the at least one remaining data block to be excluded is associated with at least one of the uplink resources that have been allocated first in time.

9. The method of claim 7, wherein the at least one remaining data block to be excluded is identified by an offset indicator that is sent together with the allocation information to the device.

10. The method of claim 7, wherein the associations between the remaining data blocks and the allocated uplink resources are predefined and based on the allocation information.

11. The method of claim 7, wherein the remaining data blocks are associated with identifiers, respectively, such that each remaining data block is identified by a respective identifier.

12. The method of claim 11, wherein the identifiers are sequence numbers.

13. A network node, configured to be comprised in a wireless communication network, for managing allocation of uplink resources regarding a plurality of data blocks of an uplink transmission performed by a device, the network node is being configured to:
send, to the device, first allocation information that identifies uplink resources that have been allocated to the device for uplink transmission of said plurality of data blocks, the plurality of data blocks being associated with the first allocated uplink resources, respectively; and
send, to the device, a second allocation information that identifies at least one of said first allocated uplink resources identified by the first allocation information and that have been allocated for uplink transmission of said plurality of data blocks, said second allocation information further excluding association of one data block of the plurality of data blocks with a second uplink resource allocation by identifying at least one of said remaining data blocks as data blocks to be excluded by the device and preserving the association of the other data blocks that were not excluded with the second allocated uplink resources.

14. The network node of claim 13, wherein the at least one remaining data block to be excluded is associated with at least one of the uplink resources that have been allocated first in time.

15. The network node of claim 13, wherein the at least one remaining data block to be excluded is identified by an offset indicator that is sent together with the second allocation information to the device.

16. The network node of claim 13, wherein the associations between the remaining data blocks and the allocated uplink resources are predefined and based on the first allocation information and second allocation information.

17. The network node of claim 13, wherein the remaining data blocks are associated with identifiers, respectively, such that each remaining data block is identified by a respective identifier.

18. The network node of claim 17, wherein the identifiers are sequence numbers.

19. A device for managing allocation of uplink resources regarding a plurality of data blocks of an uplink transmission performed by the device in a wireless communication network, wherein the device being configured to:
receiving, from a network node comprised in the wireless communication network, allocation information that identifies uplink resources that have been allocated to the device for uplink transmission of said plurality of data blocks, the plurality of data blocks being associated with first allocated uplink resources, respectively, and which allocation information further excludes association of one data block of the plurality of data blocks with a second uplink resource allocation by identifying at least one of the data block of the plurality of data blocks to be excluded by the device and preserving the association of the other data blocks that were not excluded with the second allocated uplink resources.

20. The device of claim 19, wherein the at least one remaining data block to be excluded is associated with at least one of the uplink resources that have been allocated first in time.

21. The device of claim 19, wherein the at least one remaining data block to be excluded is identified by an offset indicator that is sent together with the allocation information to the device.

22. The device of claim 19, wherein the associations between the remaining data blocks and the allocated uplink resources are predefined and based on the allocation information.

23. The device of claim 19, wherein the remaining data blocks are associated with identifiers, respectively, such that each remaining data block is identified by a respective identifier.

24. The device of claim 23, wherein the identifiers are sequence numbers.

* * * * *